US010142619B2

(12) United States Patent
Ben-Arie (10) Patent No.: US 10,142,619 B2
(45) Date of Patent: Nov. 27, 2018

(54) WIDE ANGLE VIEWING DEVICE II (71) Applicant: Jezekiel Ben-Arie, Carlsbad, CA (US)

(72) Inventor: Jezekiel Ben-Arie, Carlsbad, CA (US)

( * ) Notice: Subject to any disclaimer, the term of this patent is extended or adjusted under 35 U.S.C. 154(b) by 142 days.

(21) Appl. No.: 15/413,438

(22) Filed: Jan. 24, 2017

(65) Prior Publication Data
US 2017/0142408 A1    May 18, 2017

Related U.S. Application Data (63) Continuation-in-part of application No. 13/932,024, filed on Jul. 1, 2013, now Pat. No. 9,612,447.

(60) Provisional application No. 61/690,653, filed on Jul. 2, 2012.

(51) Int. Cl.
*G02F 1/1335*    (2006.01)
*H04N 13/344*    (2018.01)
*G02B 27/22*    (2018.01)
*G02B 27/01*    (2006.01)

(52) U.S. Cl.
CPC ....... *H04N 13/344* (2018.05); *G02B 27/0172* (2013.01); *G02B 27/2228* (2013.01); *G02F 1/133526* (2013.01); *G02B 2027/0134* (2013.01)

(58) Field of Classification Search
CPC .............. H04N 13/344; G02B 27/2228; G02B 27/0172; G02B 2027/0134; G02F 1/133526
See application file for complete search history.

(56) References Cited

U.S. PATENT DOCUMENTS

2004/0108971 A1 * 6/2004 Waldern ............. G02B 27/0093 345/8

* cited by examiner

*Primary Examiner* — Charles Chang (57) ABSTRACT

A device for 3D wide angle viewing, comprising of goggles installed with a set of Vector Light Sources (VLSs) which emit narrow light beams each pointing only in one direction. The set of VLSs is divided into two hemispherical concentric subsets. All the VLSs included in each subset are pointed towards the center location of their subset. The device enables viewing of a pair of stereoscopic images when the center locations are adjusted to fit the locations of the user's pupils. Viewing of each pixel of the stereoscopic images is focused because it is emitted by VLS. The VLSs are constructed by installing each light source behind a lens which focuses the light into a narrow beam. The light sources could emit color using Red-Green-Blue triplets of Light Emitting Diodes, Organic Light Emitting Diodes, Liquid Cristal Displays or Laser diodes. Similar technique could be used also for flat screen displays.

20 Claims, 6 Drawing Sheets

WIDE ANGLE VIEWING DEVICE II

CROSS-REFERENCE TO RELATED APPLICATIONS

This Application is Continuation In Part of application Ser. No. 13/932,024 Filed on Jul. 1, 2013.

In addition, this Application claims priority from a Provisional Patent Application Ser. No. 61/690,653 filed on Jul. 2, 2012 (via Continuation In Part of application Ser. No. 13/932,024 Filed on Jul. 1, 2013)

FEDERALLY SPONSORED RESEARCH

Not Applicable.

SEQUENCE LISTING OR PROGRAM

Not Applicable.

TECHNICAL FIELD

The present invention relates to three dimensional (3D) viewing devices.

PRIOR ART

The principal requirement which is common to all 3D display systems is to display a stereoscopic pair of images to the right and the left eye of the viewer. These images which are usually named as stereoscopic images, depict the same scene but with two different viewpoints which correspond to the two locations of the viewer's eyes. The average distance between the two eyes is about 6.25 cm in the horizontal direction. The difference in eye locations results in left and right images which depict objects in slightly different viewpoints. The distance between the projections of corresponding object details in the left and right images is called disparity. The disparity is inversely proportional to the distance of the object from the viewer. Thus, when the object is close to the viewer, the disparity is large and it approaches zero when the object is far.

Patents on 3D display systems present a large variety of methods for generating stereoscopic imagery. The patents could be divided into 5 major approaches. The first 3 approaches utilize different means to display two different images to the left and the right eyes. The first method is called anaglyph and users have to wear glasses which have a blue (or green) transparency on one lens and red transparency on the other lens. The user is watching combined images that include the right image in one color and the left image in the second color. The transparencies split the combined image into two separate images which create the stereoscopic viewing. The anaglyph method has the disadvantage that the images perceived by the viewers are monochromatic because the color is used to separate them.

The second method, used by IMAX, employs light polarization to divide a combined image into a stereoscopic image pair. Each image is a superposition of two stereoscopic images of the same scene. These images are polarized in two mutually orthogonal directions. The viewer wears spectacles with two polarized lenses. The polarization direction of the lenses is mutually orthogonal as well. It means that when an image is projected with a polarized light which has the same direction as one of the lenses, then this image passes the lens with very little attenuation. At the same time the second lens which has a polarizer with orthogonal direction w/respect to that image blocks its passage. This way, a combined image can be split into a stereoscopic pair. Such are the methods of Lee; Seung-Chul; et al. in 20100007716 who uses screen polarization, or the methods of Popovitch et al. in 20130135588.

Another method used by IMAX also uses shutter glasses for 3D viewing. This method of 3D projection involves the use of LCD shutter glasses with no polarization. The left and right eye images are projected on the viewing screen in alternate frames. These LCD shutter glasses are synchronized to the projector and the left eye views only the left image and the right eye the right image. The main disadvantage of this method is that the refresh rates of the video must by double of a regular video to avoid noticeable flicker. Many methods for synchronization of the spectacles were proposed, such as Jacobs in U.S. Pat. No. 7,508,485.

Another method uses holographic imagery such is the method of Yoon Minsung in 20130120817. The holographic method utilizes the light phase in order to display different images to the left and the right eye.

A number of products and methods have been developed for producing 3-D images from two-dimensional images employing the Pulfrich effect. This effect is based on the relation between the viewed light intensity to the reaction time of the eye photoreceptors. Steenblik in U.S. Pat. Nos. 4,597,634, 4,717,239, and 5,002,364 proposes the utilization of diffractive optical elements with double prisms, one prism being made of a low-dispersion prism and the second prism being made of a high-dispersion prism. Takahaski, et al in U.S. Pat. No. 5,144,344 describes the use of spectacles based on the Pulfrich effect with light filtering lens of different optical densities. Beard in U.S. Pat. No. 4,705,371 utilizes gradients of optical densities in going from the center to the periphery of a lens. Hirano in U.S. Pat. No. 4,429,951 proposes spectacles with lenses that can rotate about a vertical axis to create stereoscopic effects. Laden in U.S. Pat. No. 4,049,339 describes spectacles with opaque temples and an opaque rectangular frame, except for triangular shaped lenses positioned in the frame adjacent to a nosepiece.

Davino, U.S. Pat. No. 6,598,968, '3-Dimensional Movie and Television Viewer', promotes an opaque frame that can be placed in front of a user's eyes like a pair of glasses for 3-D viewing to take advantage of the Pulfrich effect. All the methods based on pulfrich effect have the disadvantage that they can simulate only three dimensional motion in one direction and are unable to present a stereoscopic image pair on static scene.

BRIEF DESCRIPTION OF THE INVENTION

The present invention relates to a viewing device which enables to view digital images in wide angles of view. In its 2D version, the viewing device could be used to view small light emitting screens from very short distances without the need for optical lenses. Viewing screens from very short distances enables wide angles of view without requirement for large screens. The principal innovation of this invention is the proposed conversion of each light emitting picture element (pixel) into a Vector Light Source (VLS). VLSs are light sources that emit a narrow beam of light only in small range of directions. The center direction of the beam is defined as the vector's pointing direction. In our invention, all the pixels of an image are converted into VLSs which are pointed at a central point. Each VLS viewed from that central point appears in the visual field of view as a sharp point of light located at the opposite direction of the original VLS pointing direction. Hence, a large set of such VLSs could generate a wide angle spherical image, which could tessellate large parts of a sphere.

The technique of converting a light emitting source (pixel) into a VLS is quite simple. It entails placing each light source behind a lens which focuses the light of the source into a very narrowly pointed beam of light which has vector-like pointing direction.

In this invention we also propose to combine two of the 2D wide viewing angle devices described above into a stereoscopic 3D (Three-Dimensional) display device and, more particularly, to a stereoscopic 3D display device allowing humans to view 3D images and 3D video in wide angles of view, which could exceed 180 degrees both horizontally and vertically. For this purpose, this device could simultaneously display 2 or more, different, wide angle, high resolution color images at full frame rates. Such images could simulate the complete views naturally perceived by the left and the right eyes, thus creating a 3D display which emulates the complete natural views perceived by humans. The viewing angles enabled by this device could be much larger than the viewing angles provided by other 3D display devices such as 3D TVs, which are not capable of giving the viewer a full 3D sensation because their viewing angles are much narrower than natural human vision and does not provide views usually perceived by the peripheral human vision.

In order to provide sharp wide angle views with a device with small size, one has to project each pixel (picture element) of the image only in one concentric direction which emulates the direction of a light ray emitted from that pixel in a real 3D scene. The light beam emitted from that pixel must be very narrow and projected towards the center of the eye's pupil. If the light beams emitted from each pixel are not narrow enough, the view perceived by the viewer will be blurred. We name these one directional narrow light beams as Vector Light Sources (VLSs). Such VLSs could be constructed using a light source which is concentrated by a lens into a narrow light beam. As a light source one could use elements such as Light Emitting Diodes (LEDs), Organic LEDs (OLEDs), Lasers or light sources controlled by Liquid Crystal Displays (LCDs). In fact, in order to have light sources with a wide range of colors one needs to bundle triplets of light sources comprising a Red, a Green and a Blue (RGB) light sources which could be RGB LEDs, RGB OLEDs, RGB Lasers or RGB LCDs. A color VLS which emits its light only in one directional narrow light beam could be achieved by placing the RGB sources behind a lens which is focused at the desired VLS pointing direction.

The pointing directions of all these VLSs are arranged in a spherical dual-centric configuration. It means that the VLSs set is divided into two equal sized subsets. One subset, which includes approximately half of the VLSs are directed at one center, which corresponds to the location of one eye pupil and the second subset of VLSs is directed at a second center which corresponds to the location of the second eye pupil.

The requirement for a spherical concentric or dual-centric set of directions does not mean that the VLSs must be installed on a spherical surface. In one embodiment of the invention, the VLSs could be installed on a non-spherical convex surface which could be used as a visor attached to a helmet or as goggles to be worn on the face. Even though the surface is non-spherical, the directions of the VLSs installed on the device must be dual-concentric i.e. half of the VLSs are directed at the center of one eye's pupil and the other half directed at the center of the second eye's pupil.

Half of the VLSs could be regarded as if each VLS is on a surface of a sphere in which each of the VLSs has a viewing direction that corresponds to the direction of a radial line that extends from the sphere's center to the location of the VLS. The actual viewing angles of the human eye cover a bit more than 180 degrees in the horizontal direction and a bit less than 180 degrees in the vertical direction. Therefore, in the actual embodiment, one could construct our 3D viewing device on two surfaces which extend a bit more than 180 degrees of viewing directions in the horizontal plane for the left and for the right eyes and a bit less than 180 degrees in the vertical directions of both eyes. Since the surface could be non-spherical, the viewing directions of the VLSs installed on it do not have to be exactly perpendicular to the goggles' surface. Another option is to use this technique in flat screens which will enable viewers to view 3D imagery from very short viewing distances without the need for spectacles.

Our patent proposes a novel method of creating a stereoscopic image pair which has much wider viewing angles than all the previously proposed 3D viewing methods. Unlike previous methods our method uses direct projection of the stereoscopic image pair to both eyes in parallel so the video rates can be regular video rates. It does not need any spectacles or optical systems which narrow the viewing angles considerably. The viewing angles provided by our display system are as wide as the maximum viewing angles of the human eyes. Thus, our display system provides a full 3D visual sensation. The principle of operation of the device for 3D wide angle viewing is by creating two subsets of concentric Vector Light Sources (VLSs) which emit narrow light beams each pointing only in one direction. It means that all the VLSs included in each subset are pointed towards the same center location of their subset. The device enables viewing of a pair of stereoscopic images when the center locations are adjusted to fit the locations of pupils of the user. Each pixel of the stereoscopic images is focused because it is emitted by a VLS, which emits a very narrow light beam. The VLSs are constructed by installing each light source behind a tiny lens. The lens focuses the source's light into a concentrated beam which has the pointing direction of its VLS. Altogether, all the VLSs are arranged as two sets of concentric vectors. The light sources could be Light Emitting Diodes (LEDs), Organic Light Emitting Diodes (OLEDs), Liquid Cristal Displays (LCDs) or laser diodes. To avoid cross interference the light sources are separated by opaque separators.

DETAILED DESCRIPTION OF DRAWINGS

Figure 1:
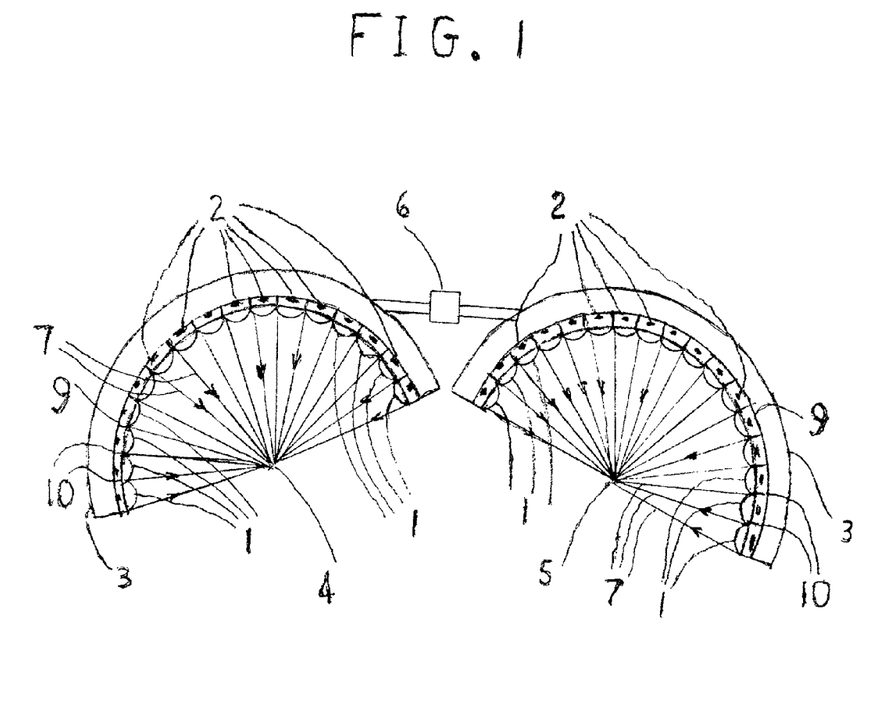
FIG. 1 illustrates an embodiment of a cross section of the goggles, which include two hemispheres tessellated with VLSs where each VLS has a pointing direction aimed at its hemisphere's center. Also shown is the VLSs cross section which includes the light sources each behind lenses. The light sources could be RGB triplets of LEDs, OLEDs, Lasers or LCDs.
Figure 6:
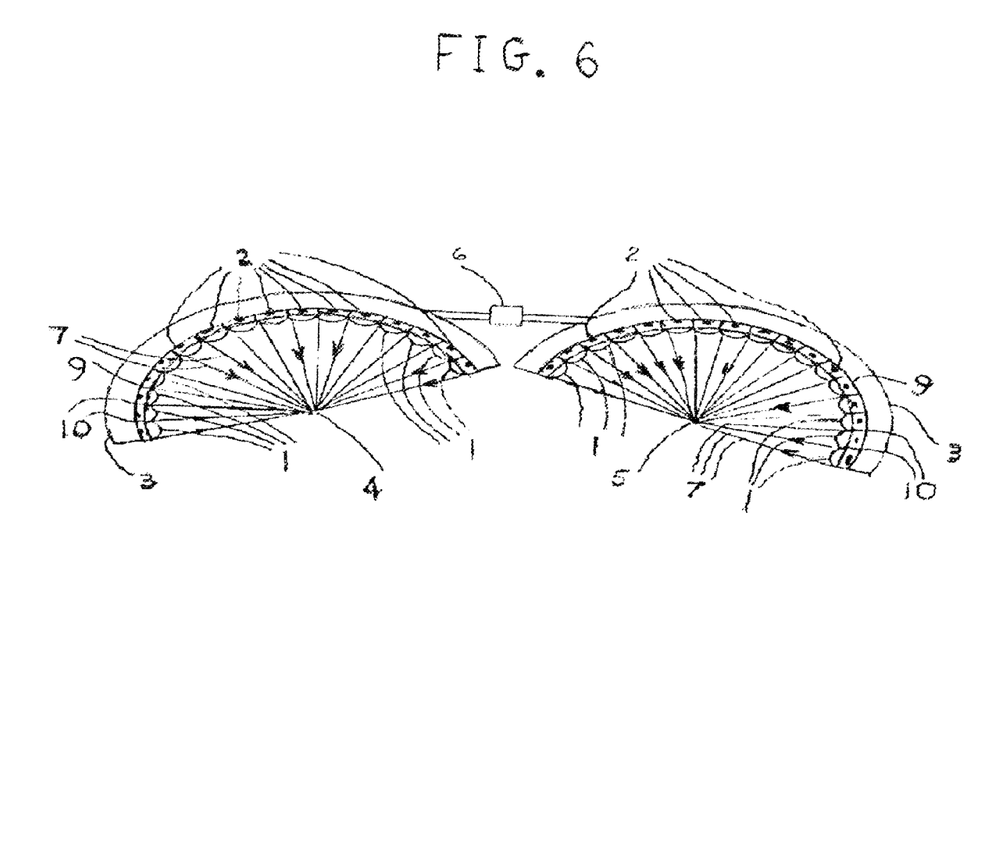
FIG. 6 illustrates an embodiment of a cross section of the non-spherical goggles, which include two convex surfaces tessellated with VLSs where each VLS has a pointing direction aimed at its surface's center. Also shown is the VLSs cross section which includes the light sources each behind lenses. The light sources could be RGB triplets of LEDs, OLEDs, Lasers or LCDs.

FIG. 1 illustrates a cross section of the goggles, which include two hemispheres tessellated with VLSs where each VLS has a pointing direction aimed at its hemisphere's centers: the left center 4 and the right center 5. Also shown is the VLSs cross section which includes the light sources 2 each one behind a lens 1. The light sources 2 could be RGB (Red-Green-Blue) triplets of LEDs, triplets of OLEDs, triplets of Lasers or triplets of LCDs. The light sources are separated by separators 10. Drawn are also the concentrated light beams 7 of the VLSs, which are pointing at one of the hemispheres' left center 4 or the right center 5. The light sources are installed on a hemispheric substrate 9, which could be opaque or even transparent if one wants to incorporate regular outside viewing with the 3D display. In this case the backplane 3 needs also to be transparent. The two hemispheres are connected by a focusing mechanism 6 which enables to adjust the distance between the left center 4 and the right center 5 to fit the distance between the corresponding left pupil and right pupil of the user. By adjusting the lenses to point the light beams at the centers 4 and 5, one can use instead of hemispheric goggles any other convex shape such as shown in FIG. 6.

Figure 2:
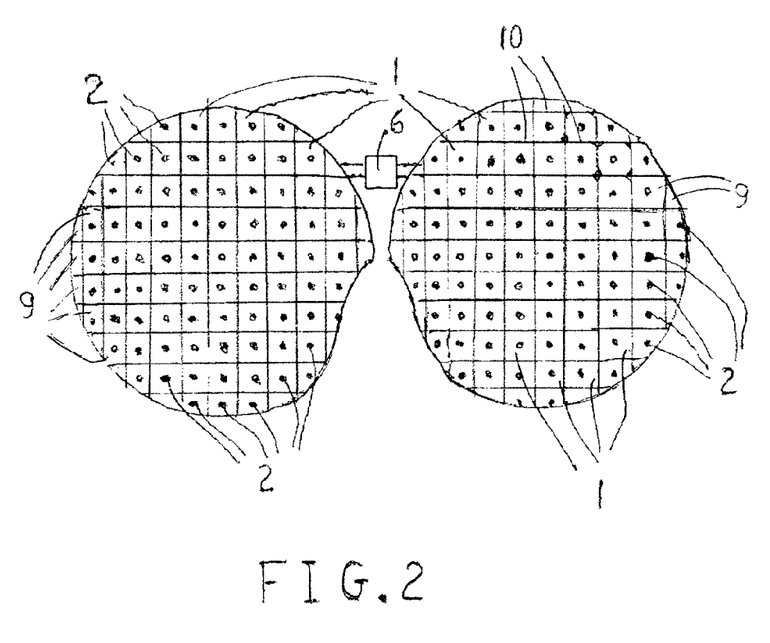
FIG. 2 illustrates an embodiment of a frontal view of the goggles viewed from the face side. The two hemispheres are tessellated with VLS in a rectangular array configuration. Other VLSs configurations such as hexagonal are also feasible.

FIG. 2 illustrates a frontal view of the goggles viewed from the face side. The two hemispheres are tessellated with VLS in a rectangular array configuration. Other VLSs configurations such as hexagonal are also feasible. Each light source 2 (which could be triplet of RGB LEDs, RGB OLEDs, RGB Lasers or RGB LCDs) is installed on a substrate 9 behind a lens 1. Each light source is surrounded by opaque separators 10. The two hemispheres are connected by a focusing mechanism 6 which enables to adjust the distance between the hemispheres centers to fit the distance between the pupils of the user.

Figure 3:
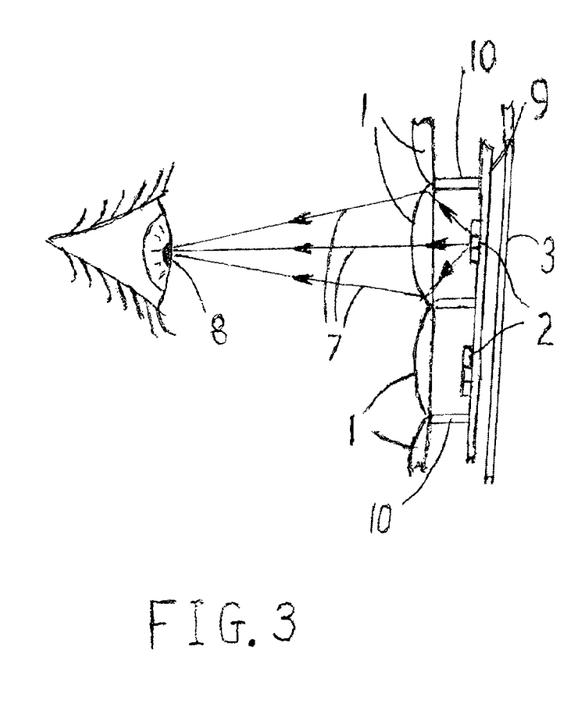
FIG. 3 shows an enlarged side view cross section of a VLS which includes the light source (could be RGB triplet) behind a lens which focuses its light into the pupil of the user's eye. Each light source is separated from its neighbors by opaque separators.

FIG. 3 shows an enlarged side view cross section of a VLS which includes the light source 2 which includes RGB triplet of LEDs, OLEDs, Lasers or LCD displays, behind a lens 1 which focuses its light beam 7 into the pupil of the user's eye 8. Each light source 2 which is installed on a substrate 9 is separated from its neighbors by opaque separators 10. A cross section of the backplane 3 is also shown.

Figure 4:
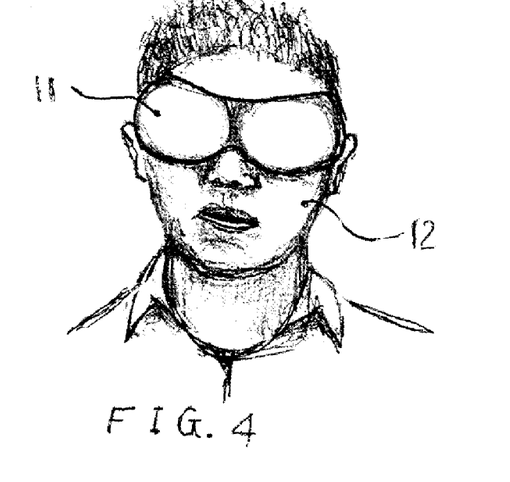
FIG. 4 illustrates a person wearing goggles of the wide angle viewing device.

FIG. 4 illustrates a user 12 wearing the wide angle viewing device goggles 11.

Figure 5:
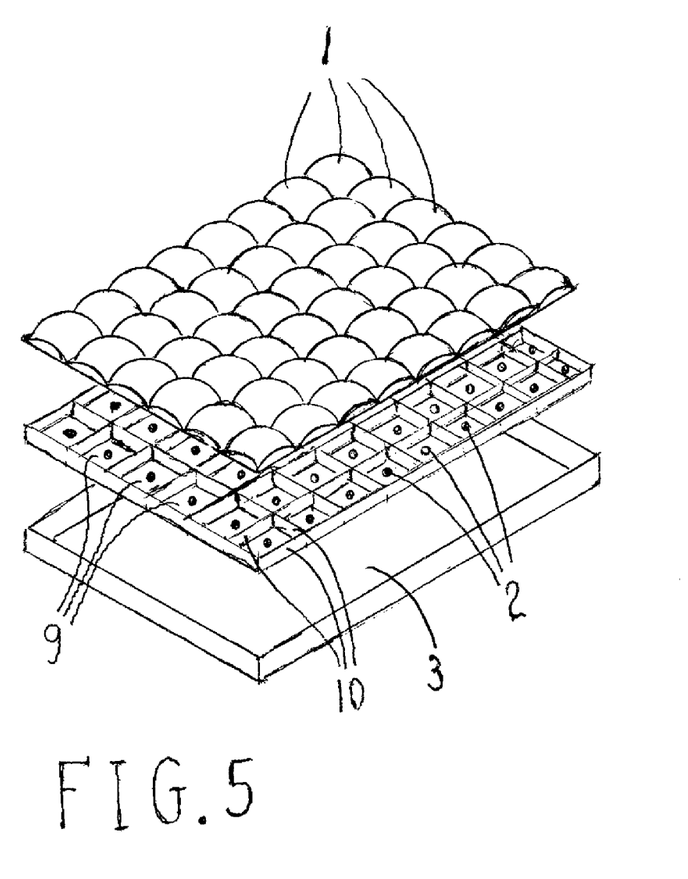
FIG. 5 depicts an embodiment of a blow up isometric drawing of an array of VLSs. The lenses are arranged in a rectangular array. Underneath each lens is a light source installed on a substrate. Each light source is surrounded by opaque separators. This kind of a VLSs array could also be used in flat screens where the concentrated VLSs enable 3D viewing from flat screens.

FIG. 5 depicts a blow up isometric drawing of an array of VLSs. The lenses 1 are arranged in a rectangular array. Underneath each lens 1 is a light source 2 (a RGB triplet) installed on a substrate 9. Each light source is surrounded by opaque separators 10. This kind of a VLSs array could also be used in flat screens where the concentrated VLSs enable 3D viewing from flat screens. The backplane 3 is drawn below.

FIG. 6 illustrates a cross section of an embodiment of a non-spherical goggles, which include two convex surfaces tessellated with VLSs where each VLS has a pointing direction aimed at its surface's center: the left surface VLSs are pointing at the left center 4 and the right surface VLSs are pointing at the right center 5. Also shown is the VLSs cross section which includes the light sources 2 each one behind a lens 1. The light sources 2 could be RGB (Red-Green-Blue) triplets of LEDs, triplets of OLEDs, triplets of Lasers or triplets of LCDs. The light sources are separated by separators 10. Drawn are also the concentrated light beams 7 of the VLSs, which are pointing at one of the hemispheres' left center 4 or the right center 5. The light sources are installed on a convex substrate 9, which could be opaque or even transparent if one wants to incorporate regular outside viewing with the 3D display. In this case the backplane 3 needs also to be transparent. The two convex surfaces are connected by a focusing mechanism 6 which enables to adjust the distance between the left center 4 and the right center 5 to fit the distance between the corresponding left pupil and right pupil of the user. By adjusting the lenses to point the light beams at the centers 4 and 5, one can use instead of hemispheric goggles any other convex shape such as the one shown in FIG. 6.

What is claimed is:

1. A wide angle viewing device comprising: a goggles; wherein said goggles has been installed with a set of vector light sources; wherein said vector light source comprising a light source which emits light rays with a predetermined range of directions; wherein the middle direction of said predetermined range of directions is defined as a pointing direction of said vector light source;

wherein said set of said vector light sources is divided into a left subset and a right subset; wherein said left subset has a left center location; wherein said right subset has a right center location; wherein all said vector light sources included in said left subset have said pointing directions which are pointed at said left center location; wherein all said vector light sources included in said right subset have said pointing directions which are pointed at said right center location;

wherein each said vector light source comprising of said light source installed behind an optical lens that focuses light rays only in said predetermined range of directions.

2. The wide angle viewing device of claim number 1, wherein said left center location can be adjusted to fit the location of the pupil of the left eye of a user; wherein said right center location can be adjusted to fit the location of the pupil of the right eye of said user.

3. The wide angle viewing device of claim number 1, wherein said left subset displays a left image; wherein said right subset displays a right image.

4. The wide angle viewing device of claim number 1, wherein each said light source comprising at least one light emitting diode; wherein when said light source is designed to emit a range of colors, said light source is comprising of: a red said light emitting diode, a green said light emitting diode and a blue said light emitting diode.

5. The wide angle viewing device of claim number 1, wherein each said light source comprising at least one organic light emitting diode; wherein when said light source is designed to emit said range of colors, said light source is comprising of: a red said organic light emitting diode, a green said organic light emitting diode and a blue said organic light emitting diode.

6. The wide angle viewing device of claim number 1, wherein each said light source comprising at least one laser; wherein when said light source is designed to emit said range of colors, said light source is comprising of: a red said laser, a green said laser and a blue said laser.

7. The wide angle viewing device of claim number 1, wherein each said light source comprising at least one said light source controlled by at least one liquid crystal display; wherein when said light source is designed to emit said range of colors, said light source is comprising of: a red said light source controlled by at least one said liquid crystal display, a green said light source controlled by at least one said liquid crystal display and a blue said light source controlled by at least one said liquid crystal display.

8. The wide angle viewing device of claim number 1, wherein said goggles comprising a multitude of said vector light sources; wherein each of said vector light source is separated from neighboring said vector light sources by opaque separators; wherein each said vector light source is installed on a substrate; wherein said substrate also includes electrical connections for said vector light source; wherein said substrate can be made of transparent material or from opaque material.

9. The wide angle viewing device of claim number 8, wherein said goggles have a cover installed behind said substrate; wherein said cover can be made of transparent material or from opaque material.

10. The wide angle viewing device of claim number 1, wherein said vector light sources included in said left subset are arranged in a left array formation; wherein said lenses which pertain to said vector light sources included in said left subset also are arranged in fitting said left array formation; wherein said lenses included in said left array formation are fabricated from a left sheet of transparent material;
wherein said vector light sources included in said right subset are arranged in a right array formation; wherein said lenses which pertain to said vector light sources included in said right subset also are arranged in fitting said right array formation; wherein said lenses included in said right array formation are fabricated from a right sheet of transparent material.

11. The wide angle viewing device of claim number 1, wherein said goggles is divided into a left part which carries said left subset and a right part which carries said right subset; wherein said left center location can be adjusted to fit the location of said pupil of the left eye and said right center location can be adjusted to fit the location of said pupil of the right eye by using a mechanism which moves said left part with respect to said right part.

12. A concentrated viewing device comprising: a screen; wherein said screen has been installed with a set of vector light sources; wherein said vector light source comprising a light source which emits light rays with a predetermined range of directions; wherein the middle direction of said predetermined range of directions is defined as a pointing direction of said vector light source; wherein said set of said vector light sources is divided into a left subset and a right subset; wherein said left subset has a left center location; wherein said right subset has a right center location; wherein all said vector light sources included in said left subset have said pointing directions which are pointed at said left center location; wherein all said vector light sources included in said right subset have said pointing directions which are pointed at said right center location; wherein each said vector light source is comprising of said light source installed behind an optical lens that focuses light rays only in said predetermined range of directions.

13. The concentrated viewing device of claim number 12, wherein said left center location can be adjusted to fit the location of the pupil of the left eye of a user; wherein said right center location can be adjusted to fit the location of the pupil of the right eye of said user.

14. The concentrated viewing device of claim number 12, wherein said screen comprising a multitude of said vector light sources; wherein each of said vector light source is separated from neighboring said vector light sources by opaque separators; wherein each said vector light source is installed on a substrate; wherein said substrate also includes electrical connections for said vector light source; wherein said substrate can be made of transparent material or from opaque material.

15. The concentrated viewing device of claim number 12, wherein each said light source comprising at least one light emitting diode; wherein when said light source is designed to emit a range of colors, said light source is comprising of: a red said light emitting diode, a green said light emitting diode and a blue said light emitting diode.

16. The concentrated viewing device of claim number 12, wherein each said light source comprising at least one organic light emitting diode; wherein when said light source is designed to emit said range of colors, said light source is comprising of: a red said organic light emitting diode, a green said organic light emitting diode and a blue said organic light emitting diode.

17. The concentrated viewing device of claim number 12, wherein each said light source comprising at least one laser; wherein when said light source is designed to emit said range of colors, said light source is comprising of: a red said laser, a green said laser and a blue said laser.

18. The concentrated viewing device of claim number 12, wherein each said light source comprising at least one said light source controlled by at least one liquid crystal display; wherein when said light source is designed to emit said range of colors, said light source is comprising of: a red said light source controlled by at least one said liquid crystal display, a green said light source controlled by at least one said liquid crystal display and a blue said light source controlled by at least one said liquid crystal display.

19. The concentrated viewing device of claim number 12, wherein said vector light sources included in said left subset are arranged in a left array formation; wherein said lenses which pertain to said vector light sources included in said left subset also are arranged in fitting said left array formation; wherein said lenses included in said left array formation are fabricated from a left sheet of transparent material;
wherein said vector light sources included in said right subset are arranged in a right array formation; wherein said lenses which pertain to said vector light sources included in said right subset also are arranged in fitting said right array formation; wherein said lenses included in said right array formation are fabricated from a right sheet of transparent material.

20. The concentrated viewing device of claim number 12, wherein said screen is divided into a left part which carries said left subset and a right part which carries said right subset; wherein said left center location can be adjusted to fit the location of said pupil of the left eye and said right center location can be adjusted to fit the location of said pupil of the right eye by using a mechanism which moves said left part with respect to said right part.

* * * * *